United States Patent [19]
Desatoff

[11] Patent Number: 5,694,115
[45] Date of Patent: Dec. 2, 1997

[54] REMOTE CONTROL ACTIVATED ELECTRIC DRIP COFFEE MAKER

[76] Inventor: Jack Desatoff, 1020 S. Hollenbeck St., West Covina, Calif. 91791

[21] Appl. No.: 661,758

[22] Filed: Jun. 11, 1996

[51] Int. Cl.⁶ .................................................. G08B 21/00
[52] U.S. Cl. .................... 340/540; 99/280; 307/140; 340/679
[58] Field of Search .................... 340/540, 539, 340/604, 618, 825.69, 825.72; 341/176; 307/140; 99/280

[56] References Cited

U.S. PATENT DOCUMENTS

| | | | |
|---|---|---|---|
| 3,783,193 | 1/1974 | Lee | 379/102 |
| 3,971,028 | 7/1976 | Funk | 343/225 |
| 4,292,546 | 9/1981 | Clark | 307/114 |
| 4,329,678 | 5/1982 | Hatfield | 340/310 A |
| 4,418,333 | 11/1983 | Schwarzbach | 340/310 A |
| 4,462,113 | 7/1984 | Iwata | 455/20 |
| 4,628,440 | 12/1986 | Thompson | 364/140 |
| 4,703,306 | 10/1987 | Barritt | 340/310 CP |
| 4,808,841 | 2/1989 | Ito | 307/11 |
| 5,247,282 | 9/1993 | Marshall | 340/539 X |
| 5,410,292 | 4/1995 | Le Van Suu | 340/310.06 |
| 5,521,445 | 5/1996 | Letorey et al. | 307/139 |
| 5,537,104 | 7/1996 | Van Dort et al. | 340/825.52 |

*Primary Examiner*—Thomas Mullen
*Attorney, Agent, or Firm*—Ben E. Lofstedt

[57] ABSTRACT

A remote control activated electric drip coffee maker including a plurality of integrated electric controllers for implementing a plurality of start control brewing times and for providing audible signals from the coffee maker and from the hand-held remote control to signal exactly when the coffee has been brewed and is ready to drink. An electrical circuit is provided at the drip coffee maker to generate an out-of-water signal for remotely notifying the user that the drip coffee maker is out-of-water is also provided.

2 Claims, 1 Drawing Sheet

REMOTE CONTROL ACTIVATED ELECTRIC DRIP COFFEE MAKER

BACKGROUND OF THE INVENTION

1. Field of the Invention

The invention herein pertains to remotely controllable electric drip coffee makers, and, more particularly, to remotely controllable electric drip coffee makers which incorporate a plurality of integrated electric controllers to provide a plurality of start control brewing times which include means for generating audible signals from both the coffee maker and from the hand-held remote control to signal exactly when the coffee has finished brewing and is ready to drink.

2. Description of the Prior Art

The prior art is replete with examples of time-activated electric coffee makers. Many coffee drinkers particularly savor their cherished cup of coffee at the very beginning of their days just after they wake up in the morning. That first cup of caffeine-laced coffee is just exactly what they need to get them "kick-started" in the morning to get them up and on their way to work, or to simply, "start their day".

A time-activated electric coffee maker provides the coffee lover with a convenient automatic means for brewing that very first cup of coffee in the morning at a pre-determined, fixed time in the morning. While this is certainly helpful, it is not quite all the convenience that the coffee lover may require as he or she starts the day.

A simple, straight-forward, time-activated electric coffee maker, however, has some drawbacks especially if you're not quite certain as to the time that you will awaken in the morning. If the coffee maker begins brewing the coffee at a certain fixed, pre-set time in the morning before the coffee drinker awakens, the brewed coffee begins to get "old", and, in less than an hour, the brewed coffee starts to become slightly toxic. Of course, the coffee drinker could always resort to getting up out of bed and start the coffee maker manually, but then, he would have to wait for the coffee to brew.

Although one might arise the same time during the working week, he might like to sleep in during his days off. In order to have freshly brewed coffee in the morning, he would have to make an educated guess as to what time he might wake up in the morning following, and reset the start time for the electric coffee maker to that particular time. As a practical matter, this is bordering on the impossible, and, accordingly, is hardly a workable plan for brewing a good, fresh cup of coffee in the morning.

The invention described herein was the creative idea of a dedicated "I really enjoy that first cup of freshly brewed coffee in the morning" aficionado. The idea incorporates the ability of the coffee drinker to start the coffee brewing by a small remote control device when he wakes up. By doing so, the coffee drinker rids himself of being a "slave" to the pre-set time of the typical electric coffee maker because he can start the brewing process anytime he wants to. So, if he wants to stay in bed for awhile, he can do so without having to hurry up and get the brewed coffee before it becomes "unfresh". With the within invention, the coffee drinker can start the coffee brewing when he chooses to do so, and stay in bed until the electric coffee maker and/or the remote controller produce an audible signal signaling to the coffee drinker that the coffee is now completed its brewing cycle, is fresh and ready to drink.

Typically, the electric controllers built-into the electric coffee maker would incorporate a four (4) position switch; namely, "OFF", "REMOTE START", "TIME START", and "MANUAL START".

The U.S. patents found in the prior art include U.S. Pat. Nos. 3,971,028, 4,292,546, 4,329,678, 4,808,841, 4,628,440, 4,703,306, 4,462,113, and 5,410,292.

U.S. Pat. No. 3,971,028 (Funk) relates to a remote light control system for controlling an electric light in a home or a building. It offers a simple, one-way transmit and receive functionality for turning an electric-powered light ON or OFF. When the light is powered ON, the light itself signals that it is ON. When the light is powered OFF, the light itself, again, signals that it is OFF. There is no two-way communication between the portable transmitter and the stationary remotely-located light which would verify that the signal was received by the receiver from the portable transmitter as envisioned by the inventor herein.

None of the other patents referenced herein relate to a wireless remote-controlled drip coffee maker.

SUMMARY OF THE INVENTIONS AND OBJECTS

Fundamentally, there is described and disclosed herein as the new and novel invention a remote control activated electric drip coffee maker including a plurality of integrated electric controllers for implementing a plurality of start control brewing times and for providing audible signals from both the coffee maker and from the hand-held remote control unit to signal exactly when the coffee has started brewing and when the coffee has finished brewing and is ready to drink. An electrical circuit is provided at the drip coffee maker to generate an out-of-water signal for remotely notifying the user that the drip coffee maker is out-of-water is also provided.

It is one primary and important object and feature of the present invention to remotely activate the START BREWING cycle of an electric coffee maker.

Another primary and important object of the instant invention is for an electronic signal to be generated from the coffee maker to the remote controller to produce an audible signal to verify that the signal from the remote controller has been received by the coffee maker at the commencement of the coffee brewing cycle and another electronic signal generated produce an audible signal to verify that the coffee in the coffee maker has finished brewing.

It is yet a still further and important feature and object of the instant invention to provide an audible means for signaling that the coffee maker has finished its coffee brewing cycle.

A still further primary and important object of the invention disclosed herein is to provide a means for electronically signaling the remote-controller to produce an audible tone or signal from the remote-controller informing the coffee drinker that the coffee has finished brewing.

Another important object of the present invention is to provide a means for remotely activating the START time any time prior to the START time previously set by the TIME START position by the manual switch on the electric coffee maker.

A yet still further important object and feature of the instant invention disclosed herein is that such new and novel combination functions as a "snooze" alarm in that it incorporates a signal which is transmitted from the electric drip coffee maker to the remote control unit which, in turn, triggers an audible signal at the time that the coffee brewing cycle is finished and ready to have that truly first fresh cup of coffee in the morning.

Another important object of the present invention is to provide a means for remotely signalling that the drip coffee maker is out of water.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

DESCRIPTION OF THE PREFERRED EMBODIMENT OF THE INVENTION

Figure 1:
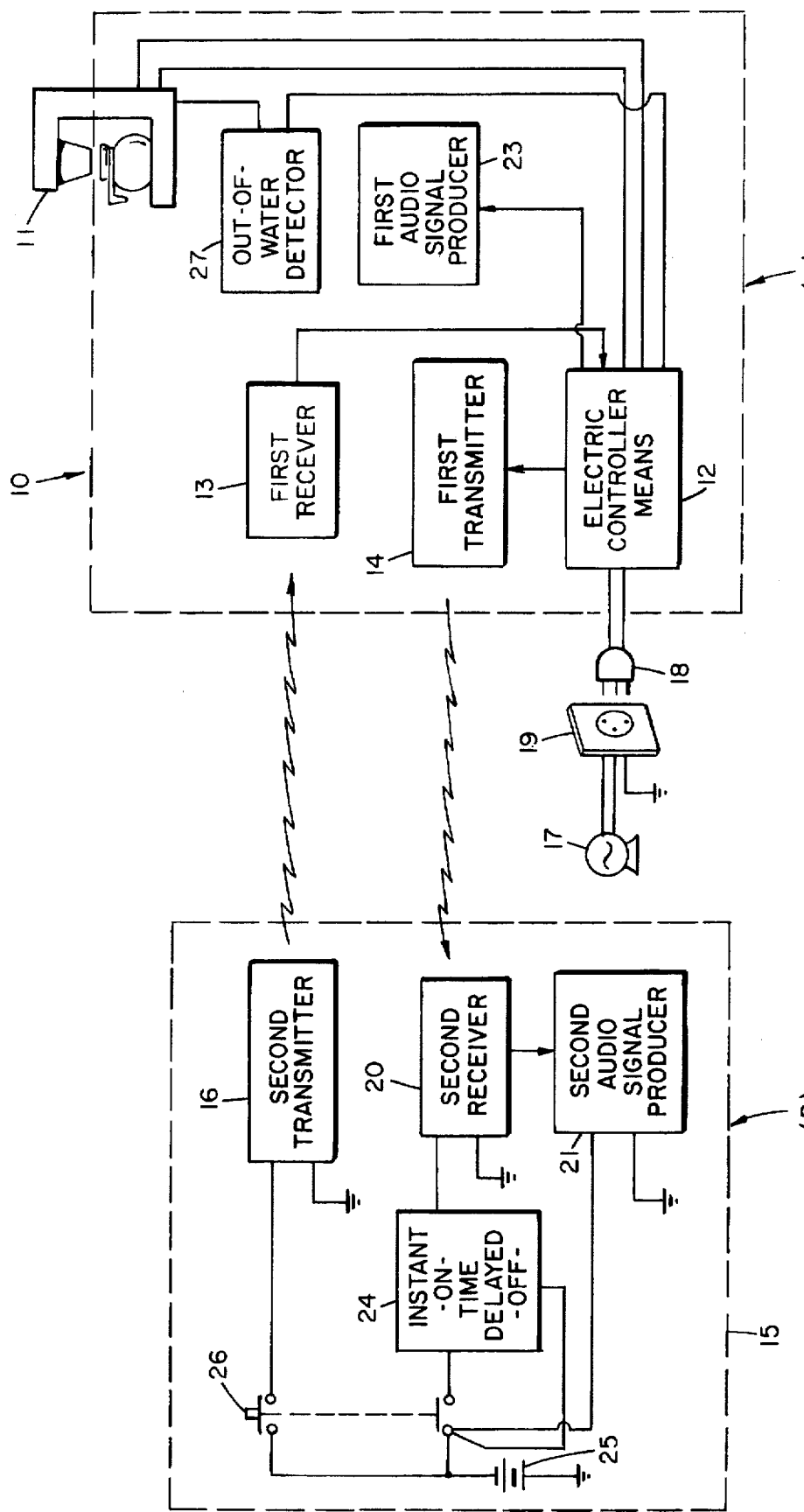
FIG. 1 is a functional block diagram of the present invention.

Fundamentally, the invention disclosed and described herein is a wireless remote control system for controlling and audibly signaling the operation of an electric drip coffee maker generally identified at 10, which includes an electric drip coffee maker 11, an electric controller means 12 disposed in the electric coffee maker for controlling the flow of electricity to the coffee maker 11, a first wireless signal receiving means 13 operably associated with the electric controller means 12 for receiving signals to activate the electric controller means 12; a first wireless signal transmitting means 14 operably associated with the electric controller means 12 for transmitting signals in response to the electric controller means 12 commencing the coffee brewing cycle of the coffee maker 11 and subsequently in response to the end of the coffee brewing cycle of the coffee maker 11, a wireless remote control means 15 including a second signal transmitting means 16 for transmitting signals to the first wireless signal receiving means 13 operably associated with the electric controller means 12 whereby the transmitted signals activate the electric controller means 12 to deliver the flow of electricity from 120 VAC source of electricity 17 to the coffee maker 11 via the electrical socket 19 to the electric plug 18 to the electric controller means 12 and onto the coffee maker 11 to initiate the coffee brewing cycle, a second wireless signal receiving means 20 operably associated with the remote controller means 12 whereby signals are received from the first signal transmitting means 14 from the coffee maker 11 in response to the commencement of the coffee brewing cycle and substantially in response to the end of the coffee brewing cycle, and a sound producing means 21 for producing an audible sound in response to signals transmitted from the first wireless transmitter 14 generated either in response to the commencement of the coffee brewing cycle or subsequently to the end of the coffee brewing cycle, and/or to produce a distinctive audible sound indicative of the lack of water in the coffee maker 11.

Additionally, as a matter of both functional importance and maximum convenience, an electrical out-of-water detector means 27 is operatively mounted in the housing (A) of the drip coffee maker 11 which is electrically connected to the drip coffee maker's water level system for the purpose of detecting whether or not there is any water in the drip coffee maker's water reservoir. If there is water in the water reservoir of the drip coffee maker 11, no signal is generated from the out-of-water detector means 27. If, on the other hand, there is no water in the drip coffee maker's water reservoir, then an electrical signal is generated by the out-of-water detector means 27 and sent to the electric controller means 12, which, in turn sends it to the first transmitter 14 to transmit a signal to the second receiver 20 in the wireless remote control means 15. The second receiver 20, upon receipt of the out-of-water signal from the first transmitter 14, sends the signal to the second audio signal producer 21 which emits a distinctive audible tone notifying the coffee drinker that the coffee cannot be brewed because there is no water in the drip coffee maker 11.

The entire system 10 is functionally contained in two different physically compact portions; an (A) portion consisting of the coffee maker 11, an electric controller means 12, a first wireless signal receiving means 13, a first wireless signal transmitting means 14, a first audio signal producer 23, and an out-of-water detector 27, and a (B) portion, also referenced at 15, which is the wireless remote control means, including a second signal transmitting means 16, a second wireless signal receiving means 20, a second audio signal producer means 21 for producing an audible sound in response to signals transmitted from the first wireless transmitter 14 generated in response to the commencement of the coffee brewing cycle or subsequently to the end of the coffee brewing cycle, and/or to produce a distinctive audible sound indicative of the lack of water in the coffee maker 11.

The entire (B) portion, referenced also by 15, is powered by a portable DC battery 25 all of which is contained in a separate, small portable housing to allow it to be readily carried by hand from place-to-place within the environs of the residence or wherever one finds it desirable or convenient to have the use of a wireless remote controlled electric drip coffee maker 11.

As can be readily seen from the forgoing description the within invention 10 offers numerous advantages of electric drip coffee makers found in the prior art. Not only does it offer one to START the electric drip coffee maker 11 ON-DEMAND by remote, wireless control, but it also operates as a SNOOZE ALARM in that the remote control unit 15 audibly advises the holder of the portable wireless remote control unit 15 of when the coffee brewing cycle is finished by triggering the audio signal producer 21.

The portable wireless remote control unit 15 is powered by a small DC battery as indicated at 25.

It is vitally important that when the portable wireless remote control unit 15 is first activated or triggered by manually depressing the START button, which is a push button momentary ON switch 26 which automatically returns to its OFF position when released, to START or initiate the coffee brewing cycle in the electric drip coffee maker 11. When the START button is depressed, the second transmitter 16 is momentarily turned ON and transmits a signal to the first receiver 13 which, in turn, sends a signal to the electric controller means 12 to activate the coffee maker 11 to the ON cycle which commences the coffee brewing cycle. When the electric controller means 12 receives the signal from the first receiver 13 to start the coffee maker 11 to initiate the coffee brewing cycle, the electric controller means 12 acknowledges the receipt of the coffee brewing start signal by delivering a signal to the first transmitter 14 which transmits a wireless signal to the second signal transmitter 16 thereby verifying that the first wireless signal receiver 13 has received a wireless signal from the second transmitter 16. The electric controller means 12 also delivers a signal to the first audio signal producer 23 initiating the production of a sound which can be heard at the remote location of the remote control unit 15. This also verifies that the signal transmitted from the second transmitter 16 was both received and delivered to the controller 12 to activate the electric controller means 12 and that the electric controller means 12 has switched electrical power ON and delivered the electrical power to the heating element of the electric drip coffee maker 11.

Once activated, an electric drip coffee maker will heat up whatever water is in the electric drip coffee maker and direct the heated water up and over the ground-up coffee beans placed in the drip basket. As the hot water drips down through the coffee in the basket, freshly brewed coffee beverage is deposited in the carafe ready to be served.

In the event that the coffee maker 11 is out-of-water, when the electric power is delivered to the coffee maker 11, the out-of-water detector 27 is activated and it delivers a signal to the electric controller means 12 causing the electric controller means 12 to turn off the electric power which it previously delivered to the drip coffee maker 11. Once this occurs, the electric controller means 12 sends a signal to the first audio signal producer 23 causing a distinctive audible sound to be emitted therefrom which can be heard remotely by others within the house. At the same time, a signal is also delivered by the electric controller means 12 to the first transmitter 14 which delivers a wireless signal to the second receiver 20 which sends a signal to the second audio signal producer 21 causing the second audio signal producer 21 to emit a distinctive audible sound to notify the person holding the wireless remote source 15 that electric power to the drip coffee maker 11 has been shut off because there is no water in the drip coffee maker 11.

An instant on-time delay off circuit 24 is operably coupled between the second receiver 20, the DC battery 25, and the second audio signal producer 21. When the push button momentary ON switch 26 is depressed thereby activating the switch 26, a time delay ON circuit is activated causing the DC battery 25 to continue to power the second receiver 20 for a predetermined period of time to allow it to receive any signals that might be transmitted by the first transmitter 14. After the passage of the pre-determined time period, the switch 26 is timed-off thereby turning off the DC battery 25 power to the second receiver 20.

In order to eliminate the likelihood of the next door neighbor from activating another person's remotely-controlled drip coffee maker 11, the user can select different digital codes in the second transmitter 16 and the second receiver 20 in the wireless remote source 15, each of which may be set to work with the first receiver 13 and the first transmitter 14. Such can be accomplished a number of ways. One way is to utilize a pair of banks of DIP-type, user-selectable switches in both the wireless remote source 15 and at the drip coffee maker 11.

From the foregoing, it can be seen that there has been provided an improved remote controlled, and remote signaling electric drip coffee maker which affords great flexibility, convenience and reliability.

What I claim as my invention is:

1. A wireless remote control system for controlling and audibly signaling the operation of an electric drip coffee maker comprising:

(a) electric controller means operably associated with the electric drip coffee maker for controlling the flow of electricity to the coffee maker;

(b) a first wireless signal receiving means operably associated with the electric controller means for receiving signals to activate the electric controller means;

(c) a first wireless signal transmitting means operably associated with the electric controller means for transmitting signals in response to the electric controller means commencing the coffee brewing cycle of the coffee maker and subsequently in response to the end of the coffee brewing cycle of the coffee maker;

(d) a wireless remote control means including:

(1) a second signal transmitting means for transmitting signals to the first wireless signal receiving means to activate the electric controller means to deliver the flow of electricity to the coffee maker to initiate the coffee brewing cycle;

(2) a second wireless signal receiving means operably associated with the remote controller means whereby signals are received from the first signal transmitting means from the coffee maker in response to the commencement of the coffee brewing cycle and substantially in response to the end of the coffee brewing cycle; and (3) sound producing means for producing an audible sound in response to signals transmitted from the first wireless transmitting means generated either in response to the commencement of the coffee brewing cycle or subsequently to the end of the coffee brewing cycle.

2. The wireless remote control system for controlling and audibly signaling the operation of an electric drip coffee maker of claim 1 further comprising an out-of-water detector means for detecting the absence of water in the water reservoir of the drip coffee maker by producing an electrical signal responsive to the absence of water in the water reservoir which signal is delivered to the electric controller means, and, thereafterwards, delivered to the first transmitter means to produce a wireless signal to be received by the second receiving means which electrically forwards the signal to the sound producing means to produce a distinctive audible sound to signal that the drip coffee maker is without water and cannot brew any coffee.

* * * * *